J. R. Logan,
Drag Saw.

Nº 78,298.      Patented May 26, 1868.

Witnesses
Wm Dean Overall
Alex F. Roberts

Inventor
James R. Logan
per Munn & Co
Attorneys.

United States Patent Office.

JAMES R. LOGAN, OF ROLLA, MISSOURI.

Letters Patent No. 78,298, dated May 26, 1868; antedated May 18, 1868.

IMPROVEMENT IN SAWING-MACHINES.

The Schedule referred to in these Letters Patent and making part of the same.

TO ALL WHOM IT MAY CONCERN.

Be it known that I, JAMES R. LOGAN, of Rolla, in the county of Phelps, and State of Missouri, have invented a new and useful Improvement in Sawing-Machines; and that the following description, taken in connection with the accompanying drawings, hereinafter referred to, forms a full and exact specification of the same, wherein I have set forth the nature and principles of my said improvement, by which my invention may be distinguished from all others of a similar class, together with such parts as I claim, and desire to have secured to me by Letters Patent.

This invention relates to certain new and useful improvements on cross-cut sawing-machines, and is more especially designed to be applied to a machine of that kind, for which Letters Patent were granted to me, bearing date 19th December, 1865.

The invention consists, first, in a novel manner of applying the wheels on which the machine is mounted to the axle thereof, whereby said wheels may be adjusted in a plane parallel with the log, to insure the ready adjustment of the saw to the log after each cut.

The invention consists, second, in an improved means for suspending the saw or keeping it in an elevated state when the machine is not in use or is being drawn from place to place.

In the accompanying sheet of drawings—

Figure 1:
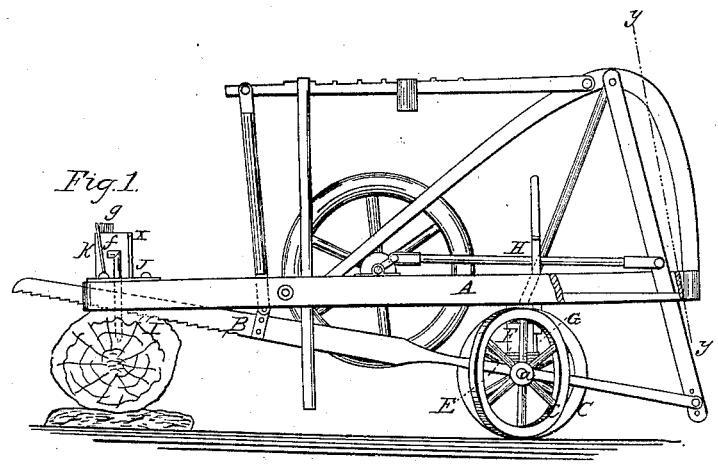
Figure 2:
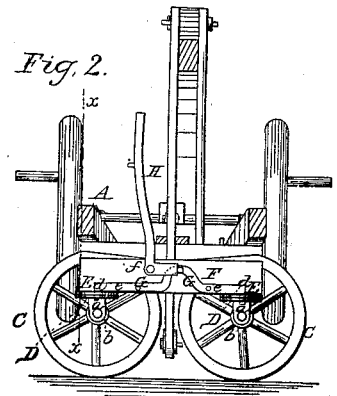

Figure 1 is a side sectional view of my invention, taken in the line $x$ $x$, fig. 2.

Figure 2, a transverse section of the same, taken in the line $y$ $y$, fig. 1.

Figure 3:
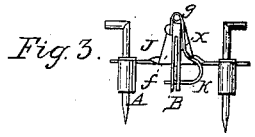

Figure 3, a detached view of the device by which the saw is held suspended.

Similar letters of reference indicate like parts.

A represents the frame of the machine, and B the saw, the latter being arranged and operated in the same way as described in the Letters Patent previously granted to me, and previously referred to, and which consequently do not here require a special description.

The frame A, at its rear part, is supported by two wheels C C, the arms $a$ of which pass through pendent ears or lugs $b$ attached to circular plates D D, which are secured by central pivot-bolts to the under sides of circular plates E, the latter being permanently secured to the axle F, on which the frame A rests.

The plates E have each a hole made in them at the rear of the axle F, through which pins $d$, at the outer ends of levers G, pass, said levers being secured by fulcrum-pins $e$ to the rear side of the axle, as shown clearly in fig. 2.

The inner ends of these levers are connected to the end of the lower arm of a bent lever, H, the fulcrum-pin $f$ of which passes into the axle F, the longer arm of said lever extending upward, as shown in figs. 1 and 2.

The circular plates D D have holes made in them to receive the pins $d$ of the levers G, which pins pass through the holes of the fixed plates E.

The holes in the plates are made at such points as to secure the wheels C C in a position at right angles with the axle F, or parallel therewith. The latter position is shown in fig. 2, and when the wheels are in this position the whole device may be moved laterally with the greatest facility, and the saw B consequently moved over the log I, after each cut of the saw, a distance equal to the lengths of the pieces into which the log is to be sawed.

The wheels also, when placed in this position, hold the device firmly, or prevent it from vibrating or moving in a longitudinal direction under the action of the saw.

In order to adjust the wheels in either of the positions specified, all that is necessary is to move the lever H, which actuates the levers G and raises the pins $d$ out from the holes in the circular plates D E, and after the wheels are adjusted in the desired position, the pins $d$ are pressed down through the holes in said plates by actuating the lever H.

On the front part of the frame A there is secured transversely a metal bar, J, the central part of which is bent upward in inverted V-form, or has a slotted inverted V-projection attached to it, and to this projection a metal guide-plate or socket, $f^\times$, is attached, which may be simply a plate doubled, the space between being sufficiently wide to receive the saw when the outer side of the same is raised. This socket $f^\times$ has a spring-catch, K, attached to it, and this catch may be constructed of a wire or rod, coiled in spiral form at its upper part to form a spring, $g$, the lower end of said wire or rod being bent in a horizontal position to pass through holes in the lower part of the socket $f^\times$, and hold up the outer end of the saw when the same is raised above the log, (see fig. 3.)

By this simple means the saw may be retained in an elevated position when the machine is being drawn from place to place, or when the log or the machine is being adjusted for a succeeding cut.

Having thus described my invention, I claim as new, and desire to secure by Letters Patent—

Moving a sawing-machine in the manner described by means of the wheels C C attached to the axle F, substantially as and for the purpose specified.

I further claim the socket $f$, attached to the cross-bar J on the front part of the frame A, and provided with the catch K, substantially as and for the purposes specified.

The above specification of my invention signed by me, this third day of June, 1867.

JAMES R. LOGAN.

Witnesses:
   A. DEMPEWOLF,
   GEORG GOETTELMAN.